United States Patent

Unger et al.

[11] 3,719,684
[45] March 6, 1973

[54] 1,2,3, 11B-TETRAHYDROPYRIDO-[3,4,5:M,N] THIOXANTHENES, THE ACID ADDITION SALTS THEREOF

[75] Inventors: Richard Unger; Helmut Muller-Calgan, both of Darmstadt, Germany

[73] Assignee: Merck Patent Gesellschaft mit beschraenkter Haftung, Darmstadt, Germany

[22] Filed: Aug. 20, 1970

[21] Appl. No.: 65,680

[30] Foreign Application Priority Data

Aug. 22, 1969 Germany.....................P 19 42 755.5

[52] U.S. Cl.............260/294.8 A, 260/328, 424/263, 424/266
[51] Int. Cl. .............................................C07d 31/50
[58] Field of Search................................260/294.8 A

[56] References Cited

OTHER PUBLICATIONS

Burger, Medicinal Chemistry, Third Edition, Part 2, Wiley–Interscience Publishers, Page 1439 (1970).

*Primary Examiner*—Alan L. Rotman
*Attorney*—Millen, Raptes & White

[57] ABSTRACT

1,2,3,11b-Tetrahydropyrido[3,4,5:m,n]thioxanthenes of the formula

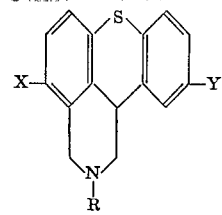

wherein X and Y each are H, alkyl of 1-4 carbon atoms or Cl and R is H or alkyl of one to four carbon atoms have psychotropic activity, including tranquilizing, hypnotic, antidepressant and narcosis-potentiating activity.

15 Claims, No Drawings

1,2,3,11B-TETRAHYDROPYRIDO-[3,4,5:M,N] THIOXANTHENES, THE ACID ADDITION SALTS THEREOF

BACKGROUND OF THE INVENTION

This invention relates to novel 1,2,3,11b-tetrahydropyrido-[3,4,5:m,n]thioxanthenes.

SUMMARY OF THE INVENTION 1,2,3,11b-Tetrahydropyrido[3,4,5:m,n]thioxanthenes of the formula

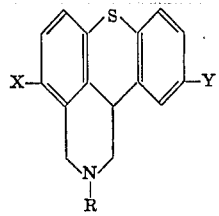

I wherein R is H or alkyl of one to four carbon atoms; X is H, alkyl of one to four carbon atoms, or Cl; and Y is H, alkyl of one to four carbon atoms, or Cl; and the physiologically acceptable acid addition salts thereof have, with a good compatibility, low toxicity, and a wide therapeutic range, psychotropic activity, including one or more of tranquilizing, hypnotic, antidepressant and narcosis-potentiating activity. Their low muscle-relaxing activity is a particular advantage of these psychic depressants.

DETAILED DISCUSSION

Of the 1,2,3,11b-tetrahydropyrido[3,4,5:m,n]thioxanthenes of Formula I, preferred are those of the formula

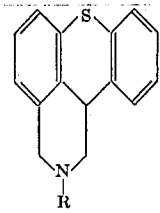

Ia

In the process aspect of this invention 1,2,3,11b-tetrahydropyrido[3,4,5:m,n]thioxanthenes of Formula I and their physiologically acceptable acid addition salts are prepared by treating with a cyclizing agent a compound of the formula

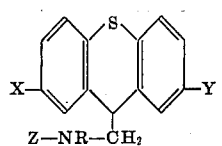

II wherein X and Y have the values given above and Z is —CHO or —CH$_2$Q, in which Q is a free or reactively esterified OH-group.

In another process aspect, a compound of the formula

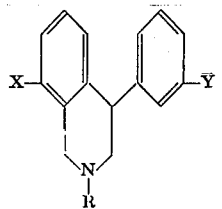

III wherein R, X, and Y have the values given above is condensed intramolecularly with agents forming thioether bridges.

In still another process aspect a compound otherwise corresponding to Formula I, but which contains in the nitrogen-containing ring one or more reducible groups, preferably one or more double bonds, especially in the 2,3- and/or 1,11b-position or 1,2-position, or which contains a carbonyl group in the 1- and/or 3-position and, when a double bond is present in the 1,2- or 2,3-position, in the form of corresponding quaternary salt, is treated with a reducing agent.

Additionally, a compound of Formula I can be treated with an alkylating agent and/or is converted into a physiologically acceptable acid addition salt thereof by treatment with an acid, or a compound of Formula I in free base form is produced from the acid addition salt thereof by treatment with a base. When R, X and/or Y are alkyl, they preferably are methyl, ethyl, and n-propyl. They can, however, also be isopropyl, n-butyl, isobutyl, sec.-butyl, and tert.-butyl.

The compounds of Formula I have an asymmetrical carbon atom. Therefore, they are obtained in the form of racemates during the synthesis thereof. These racemates are, in most cases, employed as such. They can, however, be resolved in a conventional manner into the enantiomers thereof by treatment in free base form with an optically active acid, e.g. tartaric acid, camphorsulfonic acid, mandelic acid, malic acid, lactic acid, or other substances suitable for the resolution of racemates. Such resolution of racemates can be conducted in the conventional manner employing methods well known in the literature.

The compounds of Formula I are preferably obtainable by the cyclization of compounds of Formula II. The residue Q in the compounds of Formula II can represent, in addition to a free OH-group, chlorine or bromine, or an alkylsulfonyloxy group, preferably containing one to six carbon atoms, e.g. methanesulfonyloxy, or an arylsulfonyloxy, preferably six to 10 carbon atoms, e.g. benzene- or especially p-toluenesulfonyloxy. In general, the residue Q can represent any reactive group which permits cyclization of a compound of Formula II to form a compound of Formula I.

Preferred starting compounds of Formula II are the thioxanthenes of Formula II wherein Z is CHO. These compounds can be obtained from the conventional 10-aminomethylthioxanthenes (corresponding to Formula II, Z = H) by formylation, e.g., by heating with formic acid, or by reaction with formic acid esters, such as the methyl ester of formic acid, or the ethyl ester of formic acid. During the cyclization of such compounds, there are obtained, in addition to the desired compounds of Formula I, equal amounts of compounds of Formula IVa below, by disproportionation, which latter compounds can be converted into compounds of Formula I as described hereinbelow.

Starting compounds of Formula II wherein Z is CH$_2$Q are preferably produced in situ by reacting the conventional 10-aminomethylthioxanthenes otherwise corresponding to Formula II wherein Z is H in a suitable solvent with formaldehyde or a compound yielding formaldehyde, e.g., polyoxymethylene, paraformaldehyde or formaldehyde dimethylacetal, and optionally thereafter esterifying the thus-obtained compounds of Formula II (Q=OH) with a reactive acid. For the esterification, hydrochloric acid, hydrobromic acid, methanesulfochloride, p-toluene-sulfochloride, or benzenesulfochloride can be employed.

The compounds of Formula II can be cyclized with acidic catalysts to obtain compounds of Formula I. Preferred catalysts are mineral acids, e.g., hydrochloric acid, hydrobromic acid, sulfuric acid, phosphoric acid, polyphosphoric acid, $PCl_3$, $PCl_5$, $POCl_3$, organic sulfonic acids e.g., toluenesulfonic acid and camphorsulfonic acid; Lewis acids, e.g. aluminum chloride, boron fluoride and zinc chloride, and acidic salts, e.g., potassium hydrogen sulfate.

The cyclization can be conducted in the presence of an additional solvent, for example, a lower alcohol, e.g., methanol and ethanol, an ether, e.g. dioxane and tetrahydrofuran, an ester, a carboxylic acid, e.g. acetic acid, a hydrocarbon, e.g. tetrahydronaphthalene, benzene and toluene, nitrobenzene, a chlorinated hydrocarbon, e.g., methylene chloride and chloroform; concentrated hydrochloric acid, or mixtures of such solvents. It is also possible to employ an excess of the cyclizing agent as the reaction solvent.

The cyclization can be conducted at temperatures of between 0° and 300° C. The reaction can be accelerated by heating, optionally up to the boiling point of the solvent employed. The reaction time is several minutes to several days. When Z is a formyl group, polyphosphoric acid is preferably employed as the catalyst in the cyclization reaction. However, the other above-mentioned reaction conditions likewise result in a reaction mixture from which the compounds of Formula I can be isolated, e.g., chromatographically.

As stated above, the compounds of Formula I are also obtainable by the introduction of a thioether bridge into compounds of Formula III. The compounds of Formula III can be prepared, for example, by the cyclization of N-formyl-2,2-diphenyl-1-aminoethanes, optionally substituted on the phenyl rings, with polyphosphoric acid and subsequent reduction of the thus-obtained 3,4-dihydro-4-phenylisoquinoline to compounds of Formula III wherein R is H. Alkylation of the nitrogen atom can be conducted in accordance with conventional methods to produce compounds of Formula II wherein R is an alkyl group of one to four carbon atoms. Preferred starting compounds of Formula III are those wherein X and Y, respectively, are hydrogen.

Suitable agents which form thioether bridges are sulfur dichloride, disulfur dichloride, sulfur, and all agents which split off sulfur under the reaction conditions, such as, for example, sulfides, polysulfides and thiosulfates. The use of Friedel-Crafts type catalysts is advantageous, e.g., aluminum chloride, boron fluoride and lithium bromide, or the etherates or alcoholates thereof. However, the reaction can also be conducted with other catalysts or without catalyst.

The compounds of Formula I can also be obtained by reducing compounds otherwise corresponding to Formula I, except that they contain at least one double bond or a carbonyl group in the nitrogen-containing ring, especially by reducing compounds of the formulas

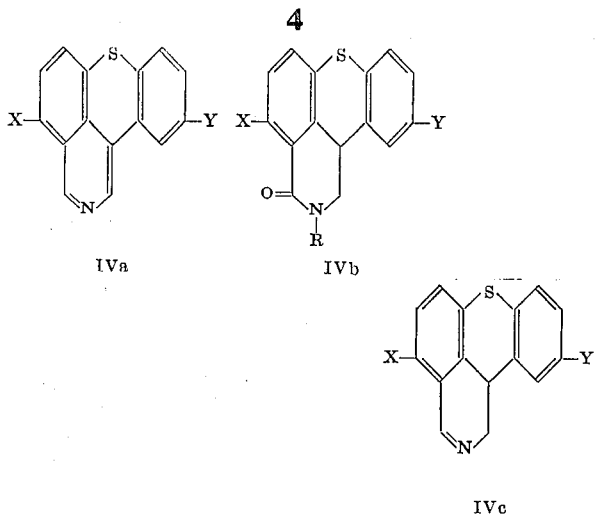

IVa IVb

IVc

Compounds of Formulas IVa and IVc can also be present in the form of the quaternary ammonium salts IVd and IVe

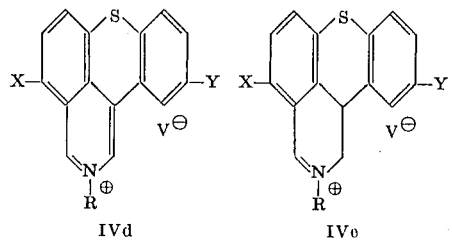

IVd IVe

In Formulas IVa – IVe X, Y and R have the values given above, and V represents an acid residue.

The starting compounds of Formula IVa can be prepared, for example, by cyclizing compounds of Formula II wherein Z is a formyl group, in the manner described above. By disproportionation, equal portions of the compounds of Formulas I and IVa are produced. The compounds of Formula IVa can be separated and can then be reduced to compounds of Formula I, or the entire reaction mixture can be treated with a reducing agent, thus reducing the compounds of Formula IVa to compounds of Formula I without isolating them.

The compounds of Formula IVa can also be prepared by treating compounds of the formula

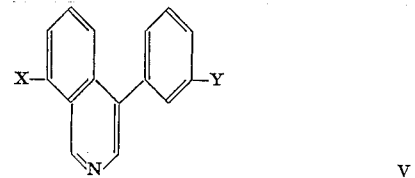

V wherein X and Y have the above-indicated meanings, with agents forming thioether bridges.

In this connection, the compounds of Formula V can also be obtained in the form of the quaternary salts thereof with a corresponding anion by alkylation of the nitrogen atom with alkyl of one to four carbon atoms. The reaction is conducted as described above.

The starting compounds of Formula IVb can be produced by cyclizing compounds of the formula

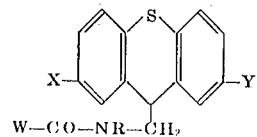

VI wherein R, X, and Y have the values given above, and W is Cl, methoxy, or ethoxy. Compounds of Formula VI are obtained by reacting the corresponding 10-aminomethylthioxanthenes with phosgene, methyl chloroformate, or ethyl chloroformate.

The starting compounds of Formula IVc can be prepared by cyclizing compounds of Formula II wherein Z is CHO under mild conditions.

The reduction of these compounds, especially those of Formulas IVa through IVc, is preferably conducted by catalytic hydrogenation or by treatment with a complex metal hydride. Suitable catalysts for the hydrogenation step are, for example, noble metal, nickel, and cobalt catalysts, as well as copper chromium oxide. The noble metal catalysts can be utilized in the form of supported catalysts, such as, for example, palladium or charcoal, calcium carbonate, or strontium carbonate, as oxide catalysts, such as, for example, platinum oxide, or as finely divided metal catalysts. Nickel and cobalt catalysts are suitably employed as Raney metals, and nickel is also employed on kieselguhr or pumice as the support.

The hydrogenation can be conducted at room temperature and under normal pressure, or also at an elevated temperature and/or increased pressure. Preferably, the reaction is conducted at pressures of between 1 and 200 atmospheres and at temperatures of between $-80°$ C. and $+150°$ C. Suitably, the reaction is conducted in the presence of a solvent, e.g. methanol, ethanol, isopropanol, ethyl acetate, dioxane, glacial acetic acid, tetrahydrofuran, or water. In some cases, the addition of a mineral acid is advantageous, for example hydrochloric or sulfuric acid. For the hydrogenation step, the free bases, e.g. IVa and IVc, the acid addition salts thereof, or the quaternary salts IVd and IVe can be employed. During the hydrogenation, care should be taken that the benzene rings are not likewise reduced. Consequently, the process is preferably conducted so that the hydrogenation is terminated after the absorption of the stoichiometric amount of hydrogen.

As stated above, advantageous reducing agents are also the complex metal hydrides, such as, in particular, LiAlH$_4$ and NaBH$_4$, optionally with the addition of catalysts, e.g. BF$_3$, AlCl$_3$, or LiBr. These reducing reactions are suitably conducted in the presence of an inert solvent, e.g., tetrahydrofuran, ethylene glycol dimethyl ether, or pyridine. When using NaBH$_4$, the reaction can also be conducted in aqueous or alcoholic solutions. The reduction is preferably carried out between $-80°$ C. and the boiling point of the solvent employed, preferably between $0°$ and $100°$ C. The thus-formed metal complexes can be decomposed, for example, with moist ether, an aqueous ammonium chloride solution, or aqueous alkali hydroxide solutions, preferably in equivalent amounts.

The compounds of Formula I can be converted into acid addition salts, preferably the physiologically acceptable acid addition salts thereof by treatment with acids. Suitable acids for this reaction are those yielding physiologically compatible salts.

For this purpose both organic and inorganic acids can be employed such as, for example, aliphatic, alicyclic, araliphatic, aromatic, or heterocyclic mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicylic acid, phenylpropionic acid, citric acid, gluconic acid, ascorbic acid, nicotinic acid, isonicotinic acid, methanesulfonic acid, ethanedisulfonic acid, naphthalenemono- and -disulfonic acid, sulfuric acid, nitric acid, hydrohalic acids, such as hydrochloric or hydrobromic acid, and the phosphoric acids, e.g. orthophosphoric acid. Other acids can be used to produce other acid addition salts for resolution, isolation, characterization and/or purification purposes.

The compounds of this invention are useful for inducing a psychic depressant effect in living beings, especially mammals. They can be used in the same manner as known thioxanthenes having tranquilizing, hypnotic, antidepressant and/or narcosis-potentiating activity.

The novel compounds can be employed in a mixture with solid and/or liquid and/or semi-liquid excipients in the human or veterinary medicine. Suitable carriers are such organic or inorganic substances which are suitable for parenteral, enteral, or topical application and which do not react with the novel compounds, such as, for example, water, vegetable oils, polyethylene glycols, gelatin, lactose, amylose, magnesium stearate, talc, vaseline, cholesterol. For parenteral application, especially suitable are solutions, preferably oily or aqueous solutions, as well as suspensions, emulsions, or implants. Furthermore, advantageous for enteral application are tablets, dragees, syrups, and juices, and for topical application, salves, creams, or powders. The above-mentioned preparations can optionally be sterilized or mixed with auxiliary substances, such as preservatives, stabilizers, or wetting agents, salts for influencing the osmotic pressure, buffers, coloring, flavoring, and/or aromatous substances.

The substances of this invention are preferably administered in a dosage of 1 – 500 mg. per dosage unit, preferably in admixture with 1 – 5000 mg. of a pharmaceutical carrier.

In the following examples, the temperatures are set forth in degrees centigrade.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1 a. 120 g. of 10-formylaminomethyl-thioxanthene (m.p. $130°$–$131°$; obtainable by boiling 10-aminomethyl-thioxanthene with formic acid in toluene for 12 hours) is added to a mixture which was previously stirred for 4 hours at $140°$, consisting of 524 g. of phosphorus pentoxide and 404 g. of 89 percent phosphoric acid. Within 30 minutes, the reaction mixture is heated, under agitation, to $200°$; this temperature is maintained for 2 hours, and then the mixture is cooled to $100°$. After the dropwise addition of 560 ml. of water and 1850 ml. of 47 percent potassium hydroxide solution, the reaction mixture is allowed to cool to room temperature, and extracted with chloroform. The chloroform solution (A) is dried and evaporated. By means of column chromatography, 1,2,3,11b-tetrahydropyrido[3,4,5:m,n]-thioxanthene is isolated from the reaction mixture and precipitated as the hydrobromide by means of ethanolic hydrobromic acid. After boiling out with ethanol, vacuum-filtering, and drying, 1,2,3,11b-tetrahydropyrido[3,4,5:m,n]thioxanthene hydrobromide is obtained, m.p. 305°. Furthermore, pyrido[3,4,5:m,n]thioxanthene, m.p. 146°, is obtained from the reaction mixture.

Analogously, by treatment with polyphosphoric acid, there are obtained from:

2-chloro-10-formylaminomethyl-thioxanthene (m.p. 126°)
2-methyl-10-formylaminomethyl-thioxanthene
2,8-dichloro-10-formylaminomethyl-thioxanthene
2,8-dimethyl-10-formylaminomethyl-thioxanthene
the following compounds:
4-chloro-1,2,3,11b-tetrahydropyrido[3,4,5:m,n]thioxanthene (m.p. 109°–110°; hydrobromide, m.p. 309°–310°)
10-chloro-1,2,3,11b-tetrahydropyrido[3,4,5:m,n,]thioxanthene (hydrobromide, m.p. 306°; methanesulfonate, m.p. 229°)
4-methyl-1,2,3,11b-tetrahydropyrido[3,4,5:m,n]thioxanthene
10-methyl-1,2,3,11b-tetrahydropyrido[3,4,5:m,n]thioxanthene
4,10-dichloro-1,2,3,11b-tetrahydropyrido[3,4,5;m,n]thioxanthene
4,10-dimethyl-1,2,3,11b-tetrahydropyrido[3,4,5:m,n]thioxanthene and, as by-products, the following compounds are obtained:
4-chloropyrido[3,4,5:m,n]thioxanthene
10-chloropyrido[3,4,5:m,n]thioxanthene
4-methylpyrido[3,4,5:m,n]thioxanthene
10-methylpyrido[3,4,5:m,n]thioxanthene
4,10-dichloropyrido[3,4,5:m,n]thioxanthene
4,10-dimethylpyrido[3,4,5:m,n]thioxanthene 2-Chloro-10-formylaminomethylthioxanthene (m.p. 126°) can be prepared by reacting 5-chloro-2-mercaptobenzoic acid, benzene, and sulfuric acid to 2-chlorothioxanthone (m.p. 153°–154°), reducing the latter with phosphorus/hydrogen iodide to 2-chlorothioxanthene (m.p. 99°–100°), stepwise treatment with butyllithium carbon dioxide (2-chlorothioxanthenecarboxylic acid; m.p. 200°), thionyl chloride, ammonia (2-chlorothioxanthene-10-carboxylic acid amide; m.p. 184°), lithium aluminum hydride/aluminum chloride, hydrobromic acid (2-chloro-10-aminomethyl-thioxanthene hydrobromide; m.p. 276°–277°), and boiling with formic acid in toluene.

Analogously, 2-methyl-10-formylaminomethylthioxanthene is obtained, starting with 5-methyl-2-mercaptobenzoic acid.

b. Five grams of 1,2,3,11b-tetrahydropyrido[3,4,5:m,n]-thioxanthene, 30 ml. of formic acid, 1.1 g. of sodium formate, and 4.3 ml. of 35 percent aqueous formaldehyde solution are mixed together, heated for 3 hours to 60°, and then boiled overnight. Then, the reaction mixture is evaporated, the residue taken up in dilute hydrochloric acid, and the solution washed with ether. The acidic, aqueous phase is made alkaline and extracted with ether. After the addition of ethanolic hydrobromic acid, vacuum-filtering, and drying, 2-methyl-1,2,3,11b-tetrahydropyrido[3,4,5:m,n]thioxanthene hydrobromide is obtained, m.p. 241°-242°. Analogously, by precipitation with ethanolic methanesulfonic acid, 2-methyl-1,2,3,11b-tetrahydropyrido[3,4,5:m,n]thioxanthene methanesulfonate is obtained, m. p. 218°.

From
4-chloro-1,2,3,11b-tetrahydropyrido[3,4,5:m,n]thioxanthene
10-chloro-1,2,3,11b-tetrahydropyrido[3,4,5:m,n]thioxanthene
4-methyl-1,2,3,11b-tetrahydropyrido[3,4,5:m,n]thioxanthene
10-methyl-1,2,3,11b-tetrahydropyrido[3,4,5:m,n]thioxanthene
4,10-dichloro-1,2,3,11b-tetrahydropyrido[3,4,5:m,n]thioxanthene
4,10-dimethyl-1,2,3,11b-tetrahydropyrido[3,4,5:m,n]thioxanthene The following compounds are analogously obtained:
2-methyl-4-chloro-1,2,3,11b-tetrahydropyrido[3,4,5:m,n]thioxanthene, methanesulfonate, m.p. 197°–198°;
2-methyl-10-chloro-1,2,3,11b-tetrahydropyrido[3,4,5:m,n]thioxanthene, methanesulfonate, m.p. 194°–195°;
2,4-dimethyl-1,2,3,11b-tetrahydropyrido[3,4,5:m,n]thioxanthene
2,10-dimethyl-1,2,3,11b-tetrahydropyrido[3,4,5:m,n]thioxanthene
2-methyl-4,10-dichloro-1,2,3,11b-tetrahydropyrido[3,4,5:m,n]thioxanthene
2,4,10-trimethyl-1,2,3,11b-tetrahydropyrido[3,4,5:m,n]cthioxanthene, and the salts thereof.

c. 8.8 g. of 1,2,3,11b-tetrahydropyrido[3,4,5:m,n]thioxanthene is dissolved in 30 ml. of acetonitrile, and 2 g. of ethyl bromide is added thereto. After allowing the reaction mixture to stand overnight, ether is added thereto, whereupon unreacted starting material precipitates as the hydrobromide; this latter compound is vacuum-filtered. The filtrate is evaporated, the residue is dissolved in ether, and ethanolic hydrobromic acid is added. The thus-precipitated hydrobromide is recrystallized from ethanol/ether, the product being 2-ethyl-1,2,3,11b-tetrahydropyrido[3,4,5:m,n]thioxanthene hydrobromide, m.p. 236°.

Analogously, the following compounds can be prepared:
2-n-propyl-1,2,3,11b-tetrahydropyrido[3,4,5:m,n]thioxanthene hydrobromide, m.p. 216°;
2-isobutyl-1,2,3,11b-tetrahydropyrido[3,4,5:m,n]thioxanthene hydrobromide, m.p. 234°.

EXAMPLE 2 a. 53 g. of pyrido[3,4,5:m,n]thioxanthene, m.p. 146°, obtained according to Example 1(a) as a by-product, is added to a mixture of 10 g. of lithium aluminum hydride and 67 g. of anhydrous aluminum chloride in 800 ml. of absolute ether, and boiled for 15 hours. Thereafter, a solution of 71 g. of sodium hydroxide in 200 ml. of water is carefully added thereto, the reaction mixture is vacuum-filtered from the aluminum hydroxide granules, washed with ether, and the hydrobromide is precipitated from the ether solution by the addition of ethanolic hydrobromic acid, thus obtaining 1,2,3,11b-tetrahydropyrido[3,4,5:m,n]thioxanthene hydrobromide, m.p. 305°.

From:
4-chloropyrido[3,4,5:m,n]thioxanthene
10-chloropyrido[3,4,5:m,n]thioxanthene
4-methylpyrido[3,4,5:m,n]thioxanthene
10-methylpyrido[3,4,5:m,n]thioxanthene
4,10-dichloropyrido[3,4,5:m,n]thioxanthene
4,10-dimethylpyrido[3,4,5:m,n]thioxanthene the following compounds can be produced by an analogous treatment:
4-chloro-1,2,3,11b-tetrahydropyrido[3,4,5:m,n]thioxanthene
10-chloro-1,2,3,11b-tetrahydropyrido[3,4,5:m,n]thioxanthene
4-methyl-1,2,3,11b-tetrahydropyrido[3,4,5:m,n]thioxanthene
10-methyl-1,2,3,11b-tetrahydropyrido[3,4,5:m,n]thioxanthene
4,10-dichloro-1,2,3,11b-tetrahydropyrido[3,4,5:m,n]thioxanthene
4,10-dimethyl-1,2,3,11b-tetrahydropyrido[3,4,5:m,n]thioxanthene.

b. The chloroform extract (A) obtained in accordance with Example 1(a) is evaporated; the residue, without separation by chromatography, is added to a mixture of 15 g. of lithium aluminum hydride and 100 g. of anhydrous aluminum chloride in 1.5 l. of absolute ether, and boiled for 17 hours. Under ice cooling, 106 g. of sodium hydroxide in 300 ml. of water is added to the reaction mixture; the latter is vacuum-filtered from the precipitated granulated aluminum hydroxide, washed with ether, and the hydrobromide is precipitated with alcoholic hydrobromic acid, thus obtaining 1,2,3,11b-tetrahydropyrido[3,4,5:m,n]thioxanthene hydrobromide, m.p. 305°.

Analogously, the following compounds can be prepared from the other starting substances mentioned in Example 1(a):
4-chloro-1,2,3,11b-tetrahydropyrido[3,4,5:m,n]thioxanthene (hydrobromide, m.p. 309°-310°)
10-chloro-1,2,3,11b-tetrahydropyrido[3,4,5:m,n]thioxanthene
4-methyl-1,2,3,11b-tetrahydropyrido[3,4,5:m,n]thioxanthene
10-methyl-1,2,3,11b-tetrahydropyrido[3,4,5:m,n]thioxanthene
4,10-dichloro-1,2,3,11b-tetrahydropyrido[3,4,5:m,n]thioxanthene
4,10-dimethyl-1,2,3,11b-tetrahydropyrido[3,4,5:m,n]thioxanthene

EXAMPLE 3

22.3 g. of 2-methyl-4-phenyl-tetrahydroisoquinoline hydrobromide (m.p. 222°; obtainable by cyclization of N-formyl-2,2-diphenyl-1-aminoethane with polyphosphoric acid, subsequent hydrogenation on Raney nickel, and methylation with formaldehyde/formic acid), 12 g. of sulfur dichloride, and 16 g. of anhydrous aluminum chloride are agitated in 500 ml. of carbon disulfide for 12 hours at 30°. Then, the reaction mixture is poured on ice and hydrochloric acid; the organic phase is separated, and tartaric acid is added to the acidic aqueous phase. After the addition of dilute solution of sodium hydroxide, the reaction solution is extracted with ether, dried over sodium sulfate, and, with methanesulfonic acid, 2-methyl-1,2,3,11b-tetrahydropyrido[3,4,5:m,n]thioxanthene methanesulfonate is precipitated, m.p. 218°.

EXAMPLE 4 a. 23.5 g. of pyrido[3,4,5:m,n]thioxanthene, prepared as the by-product according to Example 1(a), is shaken with 100 ml. of methanol and 5 g. of Raney nickel in an autoclave at 120° and 180 atmospheres of hydrogen pressure. After the absorption of 0.2 mol of hydrogen, the reaction mixture is vacuum-filtered from the catalyst, and, by the addition of ethereal hydrobromic acid, 1,2,3,11b-tetrahydropyrido[3,4,5:m,n]thioxanthene hydrobromide, m.p. 305°, is precipitated.

b. 11.6 g. of pyrido[3,4,5:m,n]thioxanthene is mixed in nitromethane with 5 ml. of methyl iodide and stirred for 15 hours at 35°. After evaporation, the mixture is reprecipitated from ethanol/water, and dried, thus obtaining pyrido[3,4,5:m,n]thioxanthene-2-methoiodide, m.p. 243°-245°; the latter compound is dissolved in 50 ml. of methanol and, after the addition of 3 g. of Raney nickel, hydrogenated in an autoclave at 50° and 50 atmospheres of hydrogen pressure. When the hydrogen pressure does not drop any more, the reaction mixture is vacuum-filtered and precipitated with ethereal hydrobromic acid.

After reprecipitation from methanol/ether and drying, 2-methyl-1,2,3,11b-tetrahydropyrido[3,4,5:m,n]thioxanthene hydrobromide is obtained, m.p. 241°-242°.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 1,2,3,11b-tetrahydropyrido[3,4,5:m,n]thioxanthene of the formula

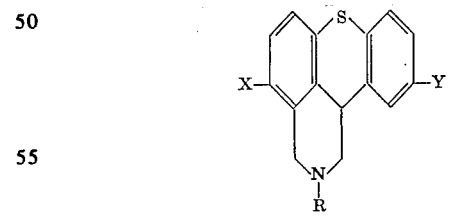

wherein R is H or alkyl of one to four carbon atoms; X is H or alkyl of one to four carbon atoms, and Y is H or alkyl of one to four carbon atoms, and the pharmaceutically acceptable acid addition salts thereof.

2. 1,2,3,11b-Tetrahydropyrido[3,4,5:m,n]thioxanthene of claim 1 wherein X and Y are H.

3. A compound of claim 1, 1,2,3,11b-tetrahydropyrido-[3,4,5:m,n]thioxanthene.

4. A compound of claim 1, 2-methyl-1,2,3,11b-tetrahydropyrido[3,4,5:m,n]thioxanthene.

5. A compound of claim 1, 2-ethyl-1,2,3,11b-tetrahydropyrido[3,4,5:m,n]thioxanthene.

6. A compound of claim 1, 2-n-propyl-1,2,3,11b-tetrahydropyrido[3,4,5:m,n]thioxanthene.

7. A compound of claim 1, 2-isopropyl-1,2,3,11b-tetrahydropyrido[3,4,5:m,n]thioxanthene.

8. A compound of claim 1, 2-n-butyl-1,2,3,11b-tetrahydropyrido[3,4,5:m,n]thioxanthene 9. A compound of claim 1, 2-isobutyl-1,2,3,11b-tetrahydropyrido[3,4,5:m,n]thioxanthene.

10. A compound of claim 1, 4-methyl-1,2,3,11b-tetrahydropyrido[3,4,5:m,n]thioxanthene.

11. A compound of claim 1, 2,4-dimethyl-1,2,3,11b-tetrahydropyrido[3,4,5:m,n]thioxanthene.

12. A compound of claim 1, 2,10-dimethyl-1,2,3,11b-tetrahydropyrido[3,4,5:m,n]thioxanthene.

13. A compound of claim 1, 4,10-dimethyl-1,2,3,11b-tetrahydropyrido[3,4,5:m,n]thioxanthene.

14. A compound of claim 1, 2,4,10-trimethyl-1,2,3,11b-tetrahydropyrido[3,4,5:m,n]thioxanthene.

15. A compound of claim 1, 10-methyl-1,2,3,11b-tetrahydropyrido[3,4,5:m,n]thioxanthene.

* * * * *